United States Patent [19]

Liotto et al.

[11] Patent Number: 4,644,858
[45] Date of Patent: Feb. 24, 1987

[54] BAKING PAN ASSEMBLY

[76] Inventors: Donna Liotto, 26 Charles St., Apt. B, Westwood, N.J. 07675; Victor Scocozza, 117 E. 30th St., New York, N.Y. 10016

[21] Appl. No.: 875,961

[22] Filed: Jun. 19, 1986

[51] Int. Cl.4 .............................................. A47J 37/01
[52] U.S. Cl. ................................. 99/449; 99/DIG. 15; 99/432; 219/10.55 E; 249/136; 249/170
[58] Field of Search ............... 99/DIG. 15, 449, 428, 99/439, 432; 219/10.55 E; 249/136, 170; 426/523

[56] References Cited

U.S. PATENT DOCUMENTS

| 854,592 | 5/1907 | Nelson | 249/170 |
|---|---|---|---|
| 1,191,672 | 7/1916 | Crosby | 99/DIG. 15 |
| 1,397,775 | 11/1921 | Neumeister | 99/DIG. 15 |
| 1,493,796 | 5/1924 | Anderson | 249/136 |
| 1,518,973 | 12/1924 | Edwards | 249/170 |
| 1,713,577 | 5/1929 | Wentorf | 249/136 |
| 1,734,328 | 11/1929 | Conry | 99/DIG. 15 |
| 1,879,268 | 9/1932 | Hurst | 99/DIG. 15 |
| 2,030,344 | 2/1936 | Young | 99/DIG. 15 |
| 2,222,512 | 11/1940 | Moyen | 99/DIG. 15 |
| 4,486,640 | 12/1984 | Bowen | 219/10.55 E |
| 4,542,271 | 9/1985 | Tanonis | 219/10.55 E |

Primary Examiner—Billy J. Wilhite
Attorney, Agent, or Firm—Michael Ebert

[57] ABSTRACT

A dual-purpose baking pan assembly suitable for use in a conventional oven wherein the assembly as well as the food therein are exposed to a high-temperature atmosphere, and in a microwave oven wherein the atmosphere is close to ambient temperature and the assembly and the food are subjected to microwave energy. All components of the assembly are formed of a dielectric material unaffected by microwave energy and capable of withstanding high temperatures. The assembly is constituted by a circular base which fits into an annular groove formed in a cylindrical shell defined by a pair of complementary half-sections whose rear ends are hinged together by a removable pivot pin and whose front ends are joinable by a detachable clamp. Thus, after a food product is baked in the assembly, the shell thereof may be detached from the base to expose the food product without disrupting its structure.

9 Claims, 8 Drawing Figures

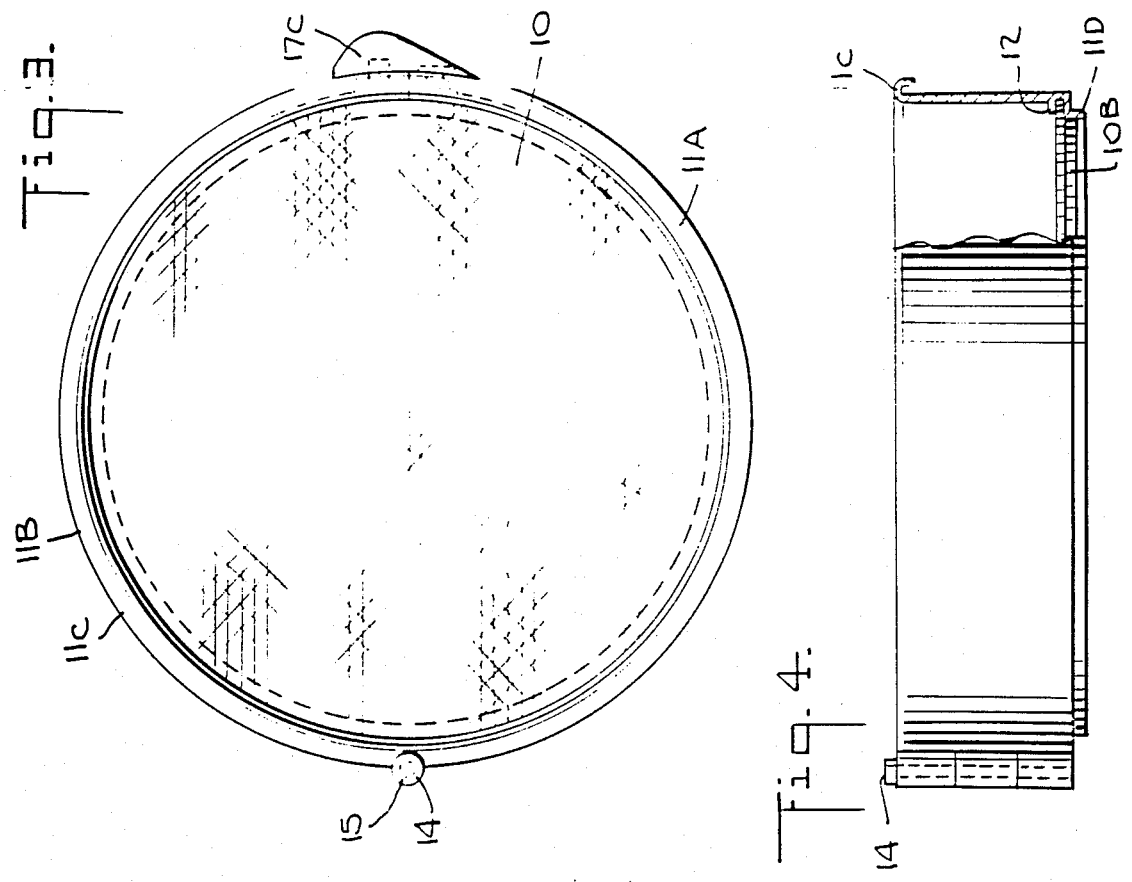
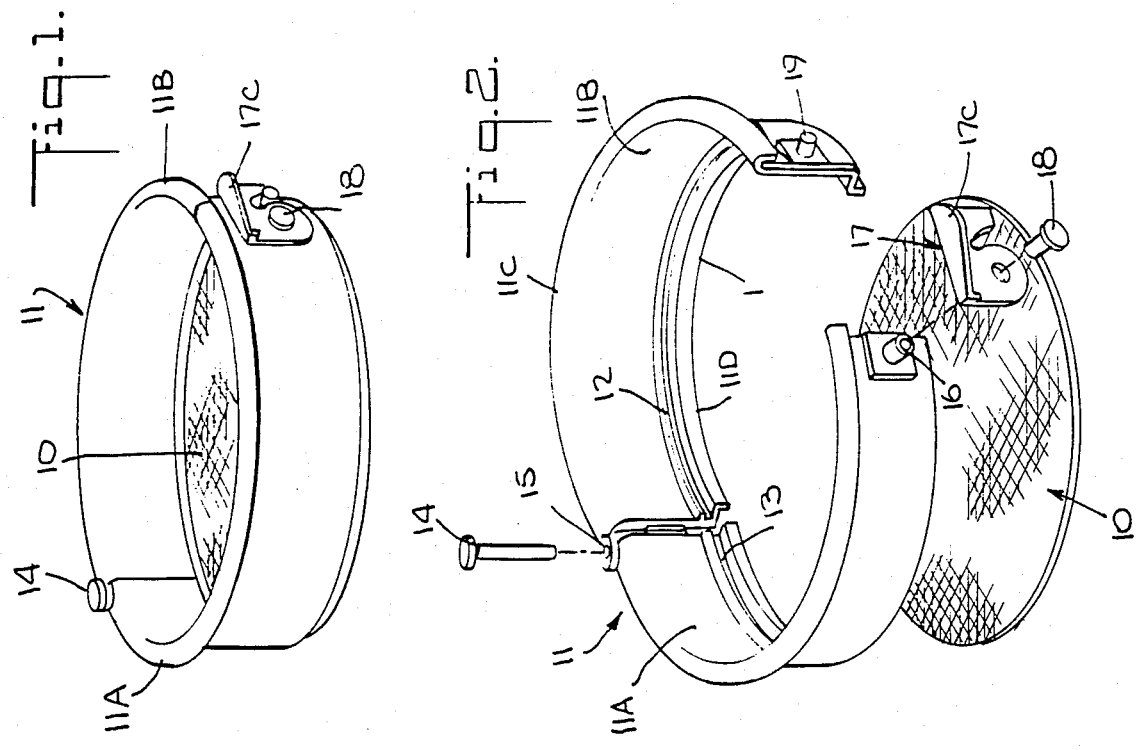

BAKING PAN ASSEMBLY

BACKGROUND OF INVENTION

1. Field of Invention:

This invention relates generally to baking pan assemblies, and more particularly to a dual-purpose assembly usable in both conventional ovens and in microwave ovens, which assembly may be disassembled after baking is completed to expose the food product without disturbing its structure.

2. Status of Prior Art

In making cakes, particularly cheesecakes, and other baked products, the utensil used for this purpose in the case of cheesecakes usually has a cylindrical form and is made of a material appropriate to the type of heating oven used. Since the present invention deals with a baking pan assembly usable in either a conventional hot air oven or in a microwave oven, the various pan requirements for these ovens will first be considered.

When a food product is baked in a conventional oven having electrical heating elements or a gas burner, the atmosphere in the oven is heated to a high temperature, and this heat energy is transferred to the surface of the food product by convection, from which surface the heat is transferred by conduction to the body of the food product. Hence, in this instance the baking pan, which may be of metallic construction, such as stainless steel or aluminum, or of non-metallic construction, such as glass or ceramics, must be capable of withstanding the high temperatures to which both the pan and the food therein are exposed.

In a microwave oven, food is internally heated by subjecting it to electromagnetic wave energy in the microwave spectrum. The frequencies most often used for this purpose are in the bands such as 2.45 GHz reserved for industrial, scientific and medical purposes. In a typical microwave oven, microwave energy generated by a magnetron is directed by a wave guide to food contained in a pan of electrically-insulating or dielectric material, so that the energy is absorbed by the food and not by the pan which remains unaffected thereby.

A pan made of metal cannot be used in a microwave oven, nor a non-metallic material having poor dielectric properties, such as one containing carbon. Metals reflect microwave energy and therefore shield the food therein from microwave energy; whereas materials having poor dielectric properties absorb microwave energy and therefore become heated thereby.

Hence, the first requirement for a baking pan to be used either in a conventional oven or in a microwave oven is that it be made of a material acceptable to both types of ovens and that this material not be brittle. Thus, certain types of tempered glass are suitable for a dual-purpose baking pan.

The second requirement has to do with the fragile nature of the baked food product. If one bakes, say, a cheesecake in a conventional pan, it then becomes difficult after baking to remove the cake from the pan without disrupting its structure. Thus, a pan molded of glass is not suitable. To solve this problem, various forms of sectioned pans have been proposed to facilitate the detachment therefrom from the food after baking is completed and the pan is withdrawn from the oven.

Thus, the Crosby U.S. Pat. No. 1,191,672 discloses a pie pan formed by a pair of complementary half sections that are joined together by latching elements so that one can detach the pan from the baked pie without disturbing the pie structure. Similar sectioned pans are shown in the Neumeister U.S. Pat. No. 1,397,775, and in the Hurst U.S. Pat. No. 1,879,268.

The Young U.S. Pat. No. 2,030,344 shows a pan having a cylindrical shield that is split and is provided with a latch to provide a tight joint around the rim of the pan. This cylindrical shield acts as a guard to prevent juice from running over the sides of the pan during baking. The Moyen U.S. Pat. No. 2,222,512 and the Conry U.S. Pat. No. 1,734,328 also show removable ring attachments for pie pans to prevent runover of juice from the pan into the baking oven.

None of these prior art baking pan assemblies which are of metallic construction is suitable for baked products such as cheesecake for both microwave and conventional ovens. Moreover, none of the prior art pans can be completely dismantled to permit thorough cleaning of all of its parts.

SUMMARY OF INVENTION

In view of the foregoing, the main object of this invention is to provide a dual-purpose baking pan assembly which can be used both for microwave and conventional ovens, and which can be detached after baking from the baked food product to expose the product for slicing and service without disturbing its baked structure.

More particularly, an object of this invention is to provide a baking pan assembly formed by a straight-sided split cylindrical shell and a circular base, whereby the shell may be detached from the base after baking.

A significant advantage of the invention is that the base of the assembly, after the shell is detached therefrom to expose the baked food product, serves as a cutting board for the product.

Yet another object of the invention is to provide an assembly which can be entirely dismantled to facilitate cleaning of all components thereof. The ability to thoroughly clean all parts is especially important in the context of a pan for use in a microwave oven; for should any baked food particles remain lodged in the pan, they will be heated by microwave energy in the next baking operation and create undesirable hot spots. The sanitary aspect is also a consideration (cleanability).

Also an object of the invention is to provide a baking pan assembly which is simple to operate and which may be manufactured at relatively low cost.

Briefly stated, these objects are attained in a dualpurpose baking pan assembly suitable for use in a conventional oven wherein the assembly as well as the food therein are exposed to a high-temperature atmosphere, and in a microwave oven wherein the atmosphere is close to ambient temperature and the assembly and the food are subjected to microwave energy. All components of the assembly are formed of a dielectric material unaffected by microwave energy and capable of withstanding high temperatures. The assembly is constituted by a circular base which fits into an annular groove formed in a cylindrical shell defined by a pair of complementary straight-sided half-sections whose rear ends are hinged together by a removable pivot pin and whose front ends are joinable by a detachable clamp. Thus, after a food product is baked in the assembly, the shell thereof may be detached from the base to expose the food product without disrupting its structure.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a baking pan assembly in accordance with the invention;

FIG. 2 shows the assembly in its disassembled condition;

FIG. 3 is a top view of the assembly;

FIG. 4 is a side view of the assembly, partly cut away;

DESCRIPTION OF INVENTION

Figure 5:
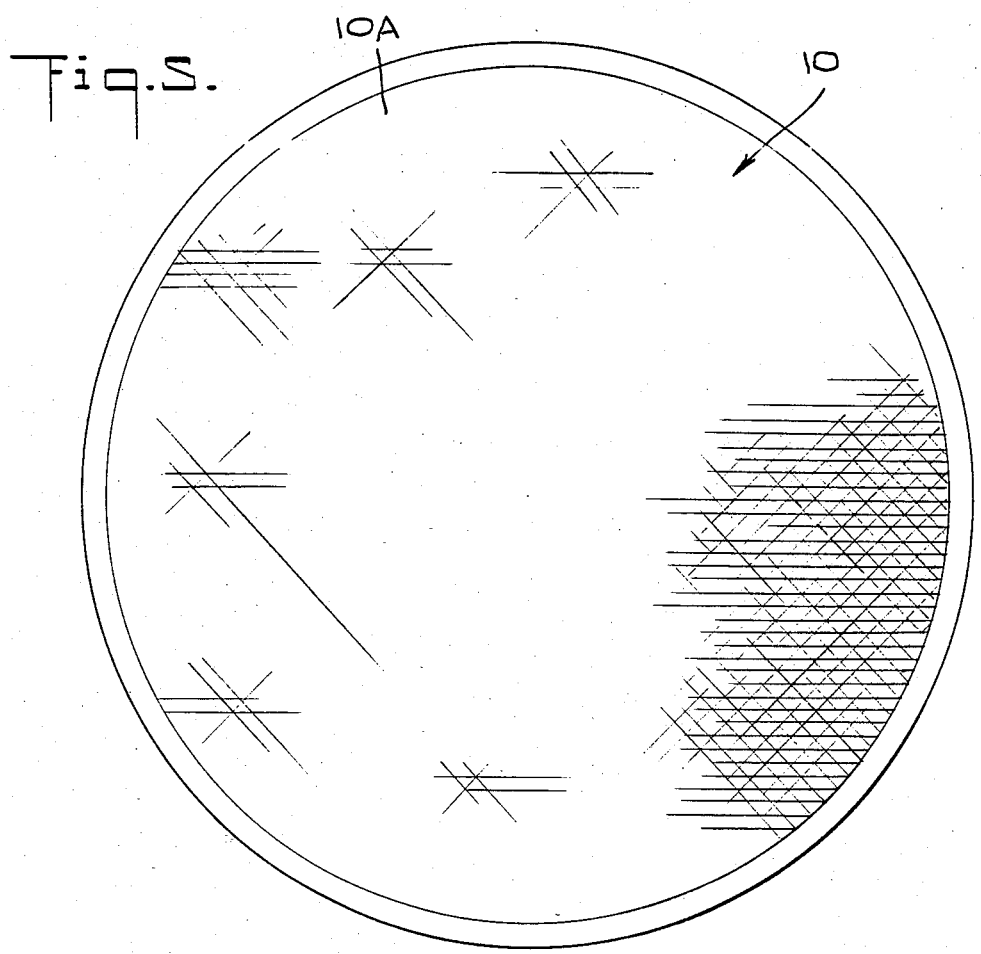
FIG. 5 is a top view of the base of the assembly.

Referring now to the figures of the drawing, there is shown a baking pan assembly in accordance with the invention whose main components are a circular base, generally designated by reference numeral 10, and a split cylindrical shell 11 formed by complementary arcuate sections 11A and 11B.

Figure 6:
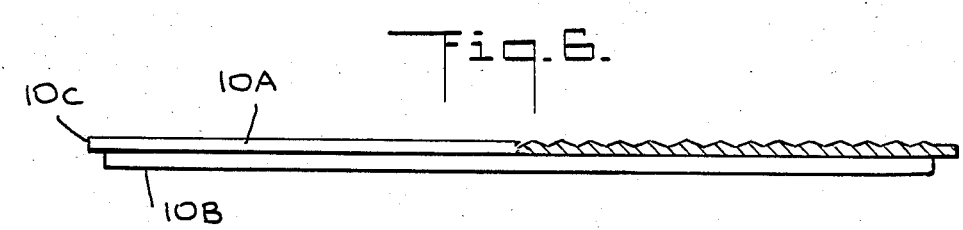
FIG. 6 is a diametrical section taken through the base.
Figure 7:
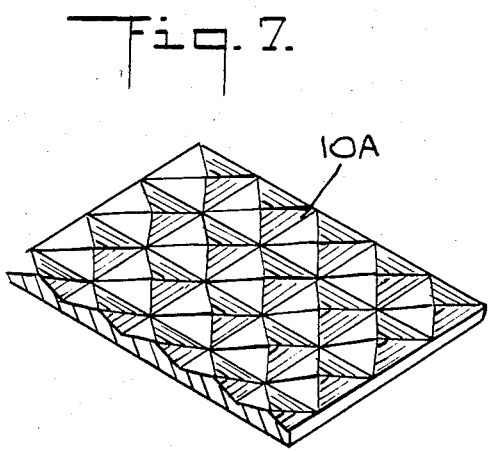
FIG. 7 is a portion of the face of the base showing its diamond-like surface formation.

As best seen in FIGS. 5, 6 and 7, base 10 has a disc-shaped upper face 10A whose surface is indented to form a repetitive diamond-like pattern thereon to prevent a baked product from sticking to the face. Below the upper face 10A and integral therewith is a circular platform 10B of slightly reduced diameter to define a peripheral lip 10C.

Sections 11A and 11B of shell 11 are provided at their upper ends with a downturned rim 11C and at their lower ends with a ring 11D of slightly reduced diameter into which is nested platform 10B of the base. A circular bead 12 is formed on the inner wall of shell 11 at a position slightly raised relative to ring 11D to define a circular inner groove 13. This groove is adapted to receive lip 10C of base 10 to form a leakproof seal therebetween when sections 11A and 11B are clamped together in the manner to be later described.

As best seen in FIGS. 1 and 2, the rear ends of shell sections 11A and 11B are hinged together by means of a removable pivot pin 14 having a head. Section 11B is provided for this purpose with a lug 15 offset from rim 11C and having a hole therein which registers with the hole in a corresponding lug in section 11A to receive the pivot pin.

Figure 8:
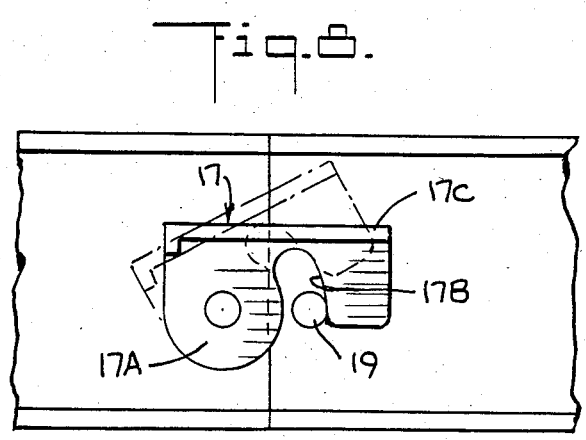
FIG. 8 is a separate view of the clamping mechanism for the shell of the pan.

Secured to the outer wall of section 11A adjacent the front end thereof and projecting therefrom is a hollow, internally-threaded post 16 on which is mounted a swingable clasp 17. This clasp has a lobe section 17A provided with a bore to accommodate a pivot screw 18 which is received in post 16, so that the swingable clasp may be lowered or raised, as shown in FIG. 8.

Clasp 17 is also provided with a cam section 17B which engages a post 19 mounted on and projecting from the outer wall of section 11B of the shell. The clasp has a handle section 17C at right angles to the cam and lobe sections 17A and 17B. The configuration is such that when the clasp is pushed down by its handle until post 19 is fully nested within cam section 17B, this produces a clamping action. This acts to draw the front ends of shell sections 10A and 10B together and at the same time acts to seal base 1 within the cylindrical shell whereby the utensil is then fully assembled and ready for use.

After baking is completed and the baked food product in the pan assembly is withdrawn from whatever oven has been used, one can then release clasp 17 and thereby free shell sections 11 and 11B. Then, by swinging out these sections, one can detach the shell from the baked product without disturbing its structure. It is not necessary at this point to remove the food product from the base, for this base can then be used as a cutting board for the pie or other food product resting thereon. And because of the diamond-like base pattern, this acts to resist displacement of the cake or other food product formed thereon.

After baking is completed, one can entirely dismantle the assembly into its separate components constituted by base 10, clasp 17, shell sections 11A and 11B and pivot pin 14, each of which can be thoroughly cleaned. As pointed out previously, it is particularly important in the case of microwave baking that all contaminants be removed from the components, for otherwise they may be heated and carbonized in the microwave oven.

All of the components of the baking pan assembly are formed of a non-metallic dielectric material which is non-responsive in a microwave field and possesses sufficient heat resistance to withstand the high temperatures encountered in a conventional oven. Also, the material should be non-brittle and of good structural strength capable of withstanding rough handling and of avoiding fracture should the assembly be inadvertently dropped onto a hard surface.

A suitable dielectric material for this purpose is a moldable synthetic plastic material such as polycarbonate having glass reinforcing fibers dispersed therein. A preferred resin is POLYLITE manufactured by Reichold Chemicals, Inc., of Jacksonville, Florida, this being an isopthalic acid-based polyester resin that can be compression or injection molded and is particularly useful in food contact applications, for it has high heat resistance and good physical properties.

While there has been shown and described a preferred embodiment of a baking pan assembly in accordance with the invention, it will be appreciated that many changes and modifications may be made therein without, however, departing from the essential spirit thereof. Thus, while the assembly has been described as a baking pan, it can also be used as a dualpurpose cooking, baking or microwave pan for foods. Also, the invention is not limited to the clamping means disclosed herein, and other forms of clamps may be used.

We claim:

1. A pan assembly for a food product comprising:
  A. a circular base having a peripheral lip;
  B. a cylindrical shell formed by a pair of arcuate sections which are hinged together at one end, said shell having adjacent its bottom an inner groove to receive the lip of the base; and
  C. means at the other ends of the sections to clamp the sections together, whereby after the food product is baked or otherwise heated, the shell may be detached from the base to expose the baked product without disturbing its structure.

2. A pan assembly as set forth in claim 1, wherein said sections have straight sides.

3. An assembly as set forth in claim 1, wherein all components thereof are formed of dielectric heat-resistant material whereby the assembly may be used either in a high temperature oven or in a microwave oven.

4. An assembly as set forth in claim 3, wherein said material is a polyester resin.

5. An assembly as set forth in claim 1, wherein the bottom of the shell has a ring formation, and said base includes a circular platform below the lip that lies within the ring to create a leak-proof seal.

6. An assembly as set forth in claim 1, wherein said sections are hinged together by a removable pivot pin.

7. An assembly as set forth in claim 1, wherein an upper face of the base is indented in a repetitive diamond-like pattern and serves as a cutting board for the food product baked thereon.

8. An assembly as set forth in claim 1, wherein said clamping means is constituted by a clasp hinged to a post on one of said sections and having a cam section which engages a post in the other section.

9. An assembly as set forth in claim 8, wherein said clasp has a handle thereon.

* * * * *